(12) United States Patent
Song et al.

(10) Patent No.: US 10,231,565 B2
(45) Date of Patent: Mar. 19, 2019

(54) ELECTRIC PRESSURE COOKER

(71) Applicants: Foshan Shunde Midea Electrical Heating Appliances Manufacturing Co. Limited, Foshan, Guangdong (CN); Midea Group Co., Ltd., Foshan, Guangdong (CN)

(72) Inventors: Yanping Song, Guangdong (CN); Ruide Chen, Guangdong (CN); Siheng Cao, Guangdong (CN)

(73) Assignees: Foshan Shunde Midea Electrical Heating Appliances Manufacturing Co. Limited, Foshan, Guangdong (CN); Midea Group Co., Ltd., Foshan, Guangdong (CN)

( * ) Notice: Subject to any disclaimer, the term of this patent is extended or adjusted under 35 U.S.C. 154(b) by 797 days.

(21) Appl. No.: 14/764,829

(22) PCT Filed: Jun. 20, 2014

(86) PCT No.: PCT/CN2014/080369
§ 371 (c)(1),
(2) Date: Jul. 30, 2015

(87) PCT Pub. No.: WO2014/206246
PCT Pub. Date: Dec. 31, 2014

(65) Prior Publication Data
US 2015/0351578 A1 Dec. 10, 2015

(30) Foreign Application Priority Data
Jun. 28, 2013 (CN) .................... 2013 2 0384029 U

(51) Int. Cl.
*A47J 27/08* (2006.01)
*A47J 27/09* (2006.01)

(52) U.S. Cl.
CPC .......... *A47J 27/0802* (2013.01); *A47J 27/09* (2013.01)

(58) Field of Classification Search
CPC .. H01H 36/02; H01H 36/0073; H01H 50/641; H01H 50/6454; A47J 27/0802; A47J 27/09
(Continued)

(56) References Cited

U.S. PATENT DOCUMENTS 4,629,131 A * 12/1986 Podell .................. A47J 43/046
241/199.12

FOREIGN PATENT DOCUMENTS

| CN | 200942020 Y | 9/2007 |
| CN | 201295139 Y | 8/2009 |

(Continued)

*Primary Examiner* — Dana Ross
*Assistant Examiner* — Spencer H. Kirkwood
(74) *Attorney, Agent, or Firm* — Rudy J. Ng; Bret E. Field; Bozicevic, Field & Francis LLP

(57) ABSTRACT

The present invention discloses an electric pressure cooker, which includes a cooker body and a cooker cover, wherein the cooker body is provided with a magnetic sensitive switch and a magnetic member, and the magnetic member can move between a first position and a second position relative to the magnetic sensitive switch so that a control circuit of the electric pressure cooker can be powered on or powered off; and the cooker cover is arranged on the cooker body, and can rotate relative to the cooker body so that the magnetic member can move between the first position and the second position. According to the electric pressure cooker, the magnetic sensitive switch and the magnetic member constitute a detection device for detecting whether the cooker cover is closed in place, and therefore the electric pressure cooker is simple in structure and low in manufacturing cost.

7 Claims, 7 Drawing Sheets

(58) Field of Classification Search
USPC .......................................................... 99/358
See application file for complete search history.

(56) References Cited

FOREIGN PATENT DOCUMENTS

| | | | |
|---|---|---|---|
| CN | 201312728 Y | * | 9/2009 |
| CN | 201312732 Y | | 9/2009 |
| CN | 201375404 Y | | 1/2010 |
| CN | 201557969 U | | 8/2010 |
| CN | 201612499 U | | 10/2010 |
| CN | 202515396 U | | 11/2012 |
| CN | 203369757 U | | 1/2014 |
| KR | 100793926 B1 | | 1/2008 |

* cited by examiner

ELECTRIC PRESSURE COOKER

FIELD OF THE INVENTION

The present invention relates to the field of household appliances, and particularly relates to an electric pressure cooker.

BACKGROUND OF THE INVENTION

In order to ensure the use safety of an electric pressure cooker and avoid the risks of cooker explosion, cover lifting and the like when the electric pressure cooker is powered on to obtain a pressure because a cover is not closed in place, a cover-closing in-place detection device is always added to the existing electric pressure cooker. However, the detection device in the prior art is complex in design and high in cost.

SUMMARY OF THE INVENTION

The present invention aims to at least solve one of the technical problems in the prior art. Thus, the present invention needs to provide an electric pressure cooker, which is provided with a magnetic sensitive switch and a magnetic member which constitute a detection device for detecting whether a cooker cover is closed in place or not. The electric pressure cooker is simple in structure and low in manufacturing cost.

The electric pressure cooker according to the present invention includes a cooker body and a cooker cover, wherein the cooker body is provided with a magnetic sensitive switch and a magnetic member, and the magnetic member can move between a first position and a second position relative to the magnetic sensitive switch so that a control circuit of the electric pressure cooker can be powered on or powered off; and the cooker cover is arranged on the cooker body, and can rotate relative to the cooker body so that the magnetic member can move between the first position and the second position.

According to the electric pressure cooker of the present invention, the magnetic member moves through arrangement of the magnetic sensitive switch and the magnetic member and through rotation of the cooker cover, so that the distance between the magnetic sensitive switch and the magnetic member is changed, and then power-on and power-off of the electric circuit of the electric pressure cooker can be controlled, that is to say, the magnetic sensitive switch and the magnetic member can constitute a detection device of the electric pressure cooker for detecting whether the cover is closed in place; and compared with a cover-closing in-place detection device in the prior art, the combination of the magnetic sensitive switch and the magnetic member is simple in structure and low in manufacturing cost.

In addition, the electric pressure cooker according to the present invention may also have the following additional technical features.

The cooker body includes a housing, an inner cooker and a housing cover, wherein the inner cooker is arranged in the housing, an accommodating cavity is defined between the housing and the inner cooker, and the magnetic sensitive switch is arranged in the accommodating cavity; and the housing cover is sleeved outside the inner cooker and closes the accommodating cavity.

The electric pressure cooker further includes a mounting member, the magnetic member is arranged on the mounting member, the mounting member can move up and down relative to the housing cover, and the upper end of the mounting member penetrates through the housing cover so as to match the cooker cover.

A guide post which extends downwards is arranged on the lower surface of the housing cover; the mounting member includes a body and a push rod, wherein the body is provided with a positioning hole matched with the guide post, and the magnetic member is arranged in the body; the push rod is arranged on the body and the upper end of the push rod penetrates through the housing cover and extends upwards; and the electric pressure cooker further includes an elastic member, the lower end of the elastic member is positioned on the guide post and the upper end of the elastic member presses against the body.

The electric pressure cooker further includes a screw, the screw is arranged on the guide post, and the lower end of the elastic member presses against the head end of the screw.

The elastic member is a spring, and the spring is sleeved outside the guide post.

An annular convex rib is arranged at the lower part of the cooker cover and provided with a yielding port capable of accommodating the push rod.

A water retaining part is also arranged in the accommodating cavity, a relatively closed accommodating space is defined between the water retaining part and the wall of the accommodating cavity, and the magnetic sensitive switch is arranged in the accommodating space.

An accommodating groove for placing the magnetic member is formed in the body, and positioning buckles for positioning the magnetic member are arranged on the accommodating groove.

The magnetic member is a magnet.

A part of additional aspects and advantages of the present invention will be given in the description below, and the other part will become obvious from the description below or be realized through practice of the present invention.

BRIEF DESCRIPTION OF THE DRAWINGS

The above-mentioned and/or additional aspects and advantages of the present invention will become obvious and are easy to understand from the description of embodiments in combination with the accompanying drawings below, in which.

Figure 1:
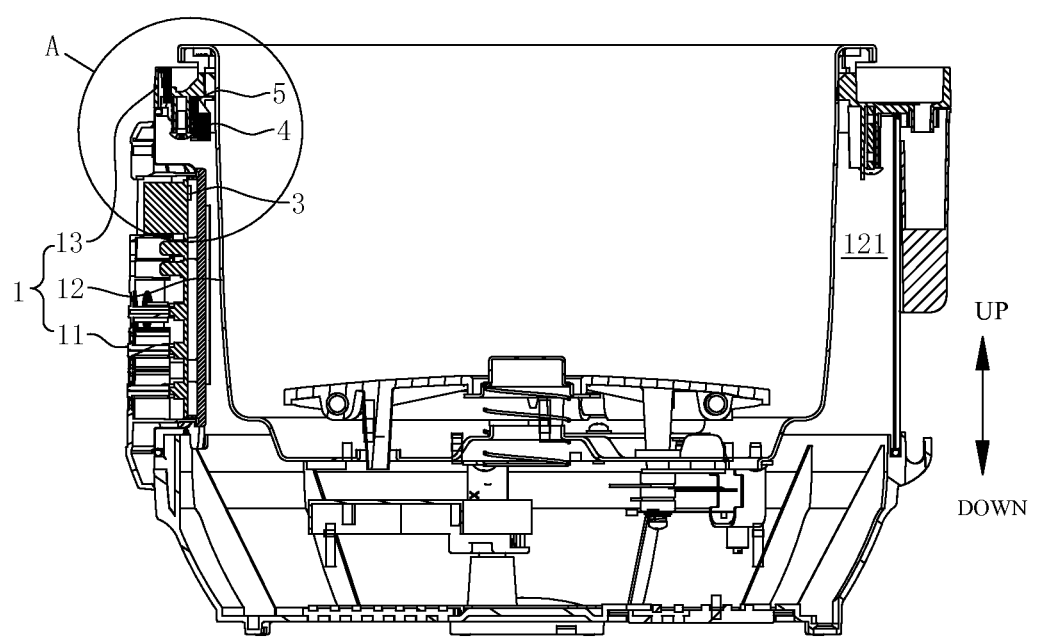
FIG. 1 is a schematic diagram showing that a cooker body of an electric pressure cooker according to an embodiment of the present invention is not covered by a cooker cover.

REFERENCE NUMERALS electric pressure cooker 100;
cooker body 1; housing 11; inner cooker 12; accommodating cavity 121; accommodating space 122; housing cover 13; guide post 131; through hole 132;
cooker cover 2; convex rib 21; yielding port 211;
magnetic sensitive switch 3; magnetic member 4;
mounting member 5; body 51; positioning hole 511; accommodating groove 512; positioning buckle 513; push rod 52;
elastic member 6; screw 7; head end 71;
control panel 8; water retaining plate 9.

DETAILED DESCRIPTION OF THE EMBODIMENTS

Embodiments of the present invention will be described in detail below, and examples of the embodiments are shown in the accompanying drawings, wherein the same or similar components or components with the same or similar functions are indicated by the same or similar signs throughout. The embodiments described with reference to the accompanying drawings below are exemplary, which are merely used for interpreting the present invention, and should not be understood as limit to the present invention.

In the description of the present invention, it should be understood that, orientations or positional relations indicated by terms "upper", "lower", "inner", "outer" and the like are the ones shown on the basis of the accompanying drawings, and are merely used for conveniently describing the present invention and simplifying the description, rather than indicating or implying that the indicated devices or components must have specific orientations and are constructed and operated according to the specific orientations, so they can not be understood as limit to the present invention. Moreover, terms "first" and "second" are merely used for the purpose of description, rather than indicating or implying the relative importance or the number of indicated technical features. Thus, the features defined by "first" and "second" may explicitly or implicitly include one or more features. In the description of the present invention, "a plurality of" indicates two or more unless otherwise noted.

In the description of the present invention, it should be noted that, unless otherwise clearly specified or defined, a broad understanding should be made to the terms "installation", "interconnection" and "connection", e.g. the "connection" may be fixed connection, detachable connection, integral connection, mechanical connection, electrical connection, direct connection, indirect connection by virtue of inter-media or communication between the inner parts of two components. The specific meanings of the above-mentioned terms in the present invention may be understood according to specific conditions for those of ordinary skill in the art.

An electric pressure cooker 100 according to an embodiment of the present invention will be described with reference to FIG. 1 to FIG. 9. The electric pressure cooker 100 according to the embodiment of the present invention, as shown in FIG. 1 to FIG. 6, includes a cooker body 1 and a cooker cover 2.

The cooker cover 2 is arranged on the cooker body 1, wherein the cooker cover 2 may be detachably arranged on the cooker body 1, namely the cooker cover 2 may be taken down from the cooker cover 2, and specifically, the cooker cover 2 and the cooker body 1 may be connected with each other through a cover tooth structure (not shown), a buckle, a clamping jaw or the like. Moreover, the cooker cover 2 may also be connected to the cooker body 1 all the time without being detached, e.g. the cooker cover 2 may be connected to the cooker body 1 through a hinge and the like, and when the cover needs to be opened, the cooker cover 2 may be opened in a turnover manner.

When the cooker cover 2 is arranged on the cooker body 1, the cooker cover 2 may rotate relative to the cooker body 1. Specifically, when the cooker cover 2 and the cooker body 1 are of a detachable structure and a user needs to buckle the cooker cover 2 for cooking, the cooker cover 2 may be first placed on the cooker body 1, and then the cooker cover 2 is rotated to cover the cooker body 1 in place for cooking.

When the cooker cover 2 and the cooker body 1 are of a non-detachable structure, a hinge may be arranged between the cooker cover 2 and the cooker body 1 for connection; when being opened, the cooker cover 2 may be connected to the cooker body 1 all the time, so that the cooker cover 2 is prevented from being lost or falling from a table top; and the cooker cover 2 may rotate relative to the cooker body 1 during closing through self rotation of the cooker cover. Because this structure belongs to the prior art, it will not be described in detail.

Figure 2:
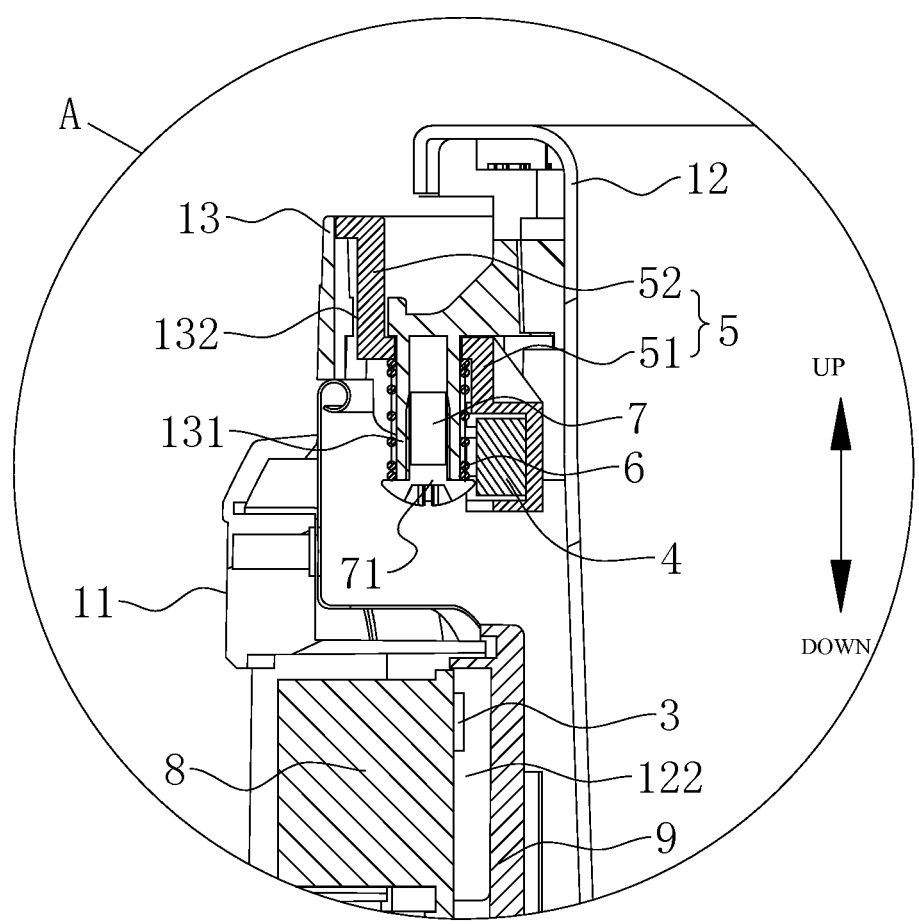
FIG. 2 is an amplified diagram of an area A in FIG. 1.
Figure 3:
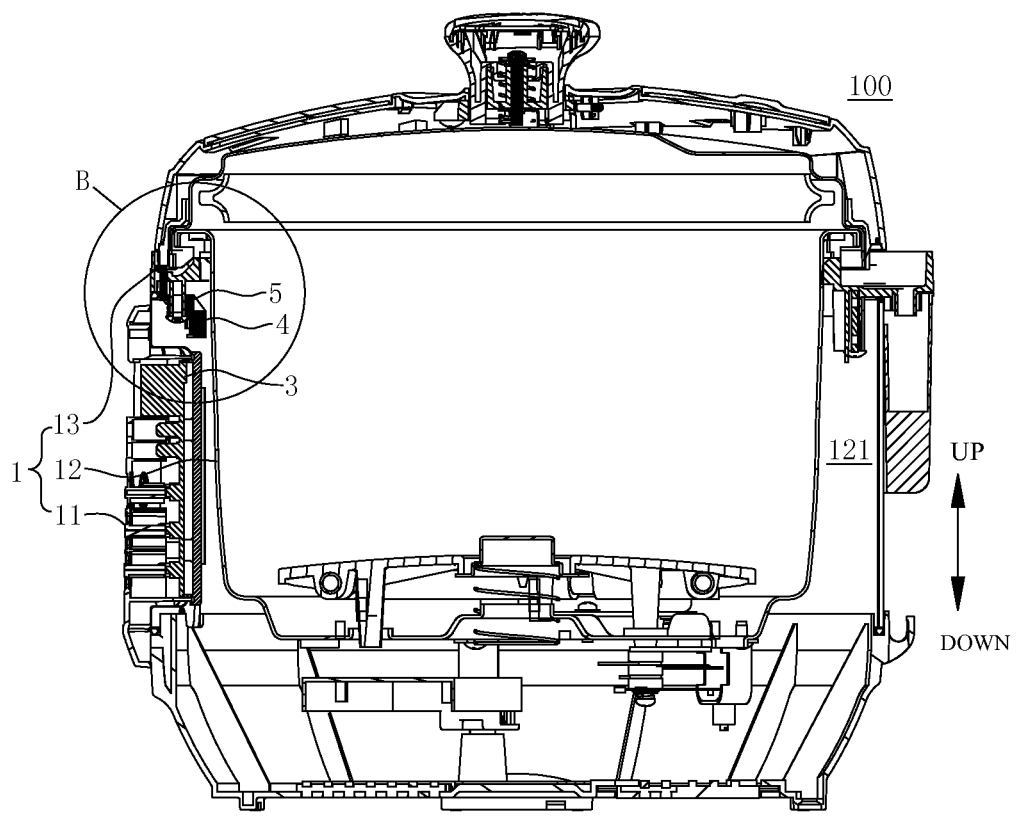
FIG. 3 is a schematic diagram showing that the cooker cover of the electric pressure cooker according to an embodiment of the present invention is not closed in place (a magnetic member is located at a second position)
Figure 4:
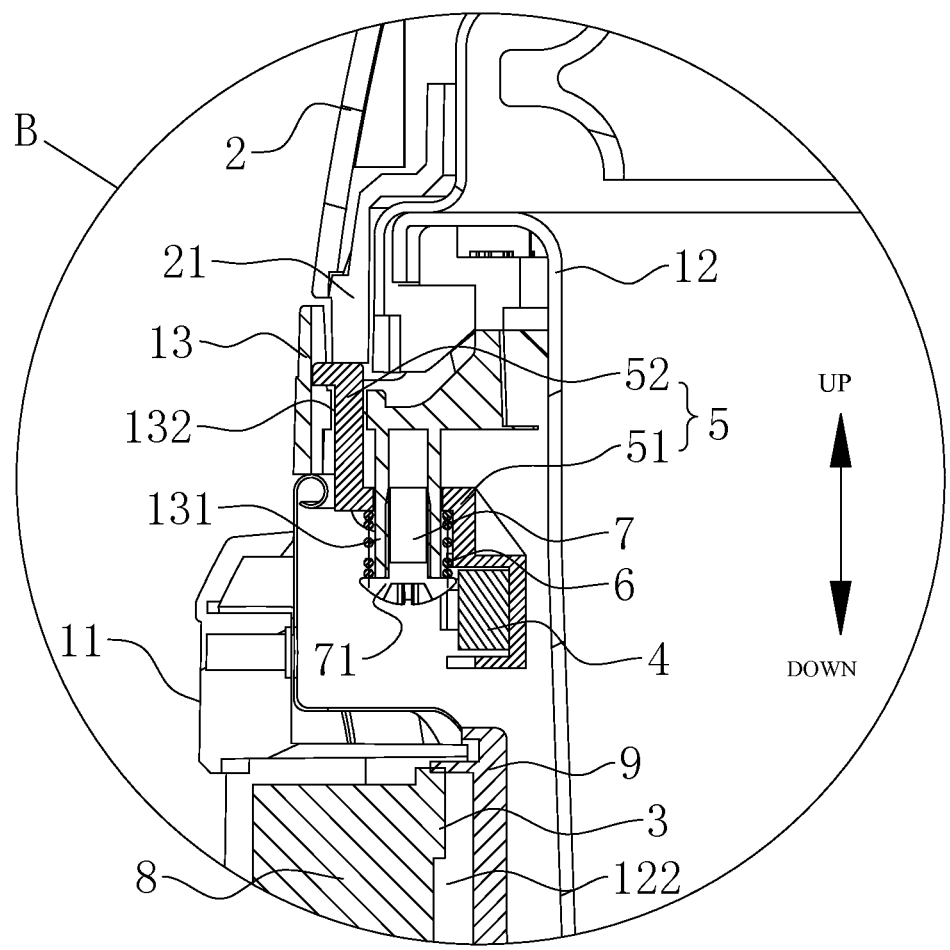
FIG. 4 is an amplified diagram of an area B in FIG. 3.
Figure 5:
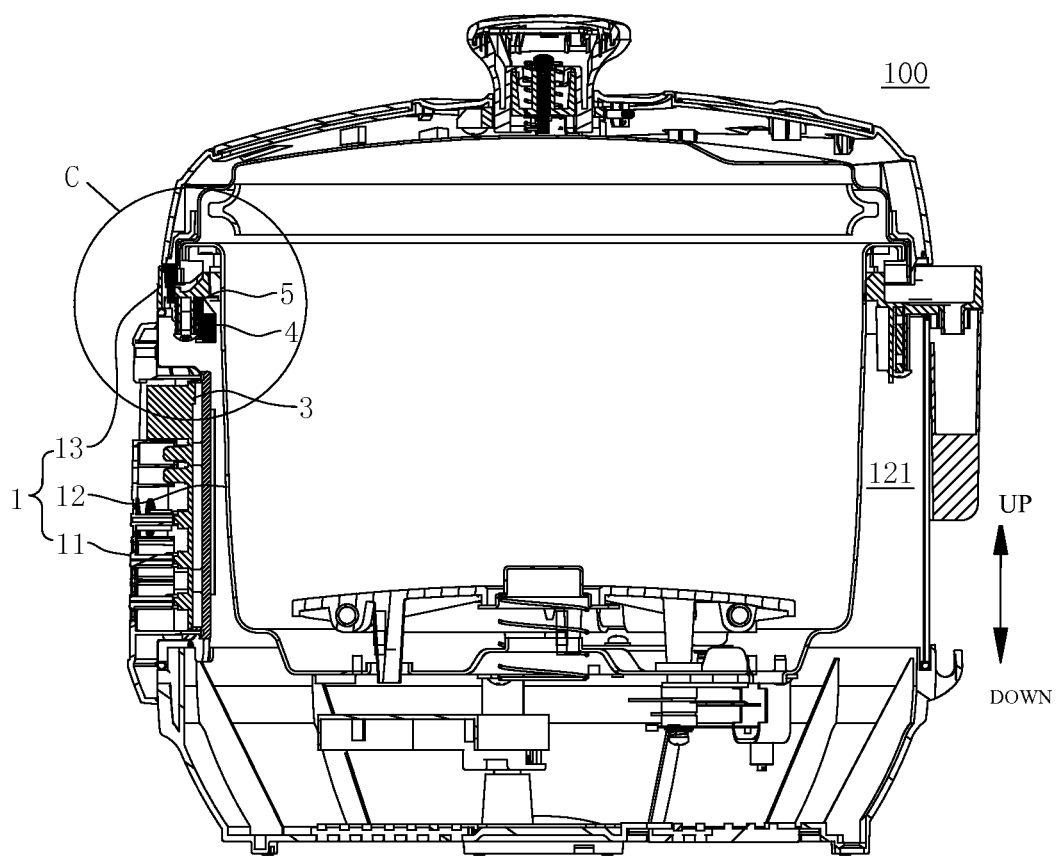
FIG. 5 is a schematic diagram showing that the cooker cover of the electric pressure cooker according to an embodiment of the present invention is closed in place (the magnetic member is located at a first position)
Figure 6:
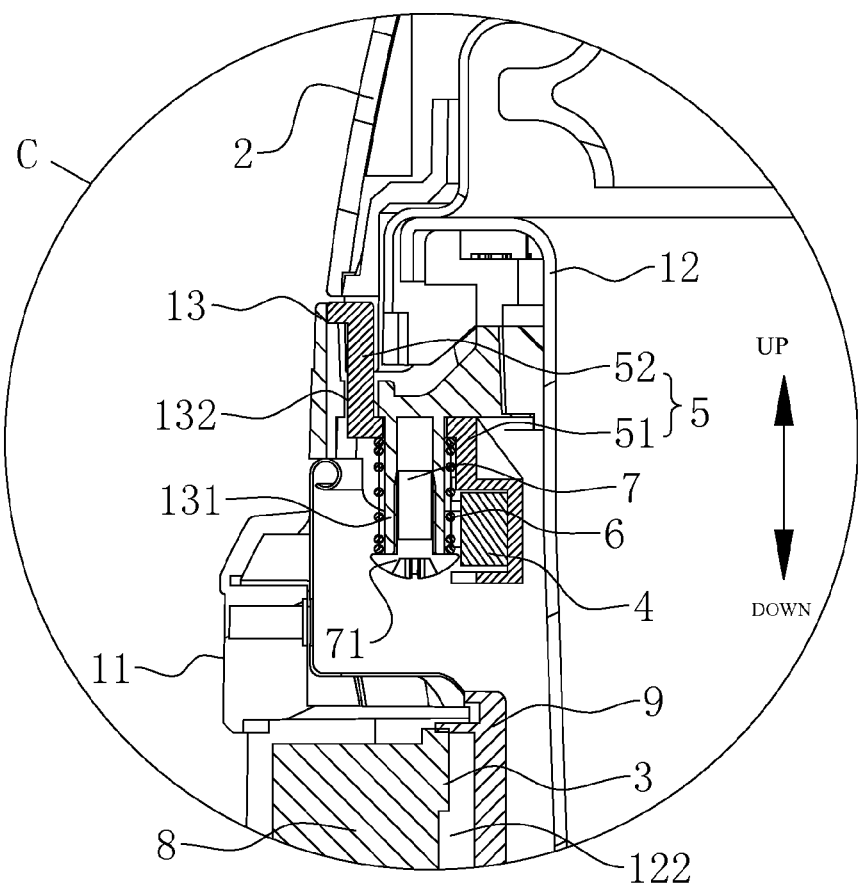
FIG. 6 is an amplified diagram of an area C in FIG. 5.
Figure 7:
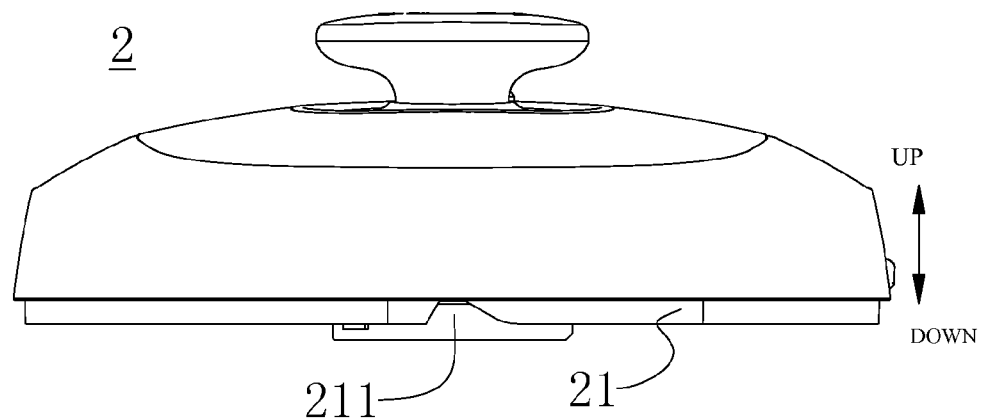
FIG. 7 is a schematic diagram of the cooker cover of the electric pressure cooker according to an embodiment of the present invention.

As shown in FIG. 1 to FIG. 6, a magnetic sensitive switch 3 and a magnetic member 4 are arranged on the cooker body 1, and the magnetic member 4 can move between a first position and a second position relative to the magnetic sensitive switch 3 so that a control circuit of the electric pressure cooker 100 can be powered on or powered off, namely an electric circuit of the electric pressure cooker 100 can be powered on or powered off. In other words, when the magnetic member 4 is at the first position relative to the magnetic sensitive switch 3, as shown in FIG. 5 and FIG. 6, the control circuit of the electric pressure cooker 100 is powered on, and the electric pressure cooker 100 can be used for cooking; and when the magnetic member 4 is at the second position relative to the magnetic sensitive switch 3, as shown in FIG. 3 and FIG. 4, the control circuit of the electric pressure cooker 100 is powered off, and the electric pressure cooker 100 can not be used for cooking.

Specifically, the magnetic sensitive switch 3 detects the change of a magnetic field around it and outputs a level, and a controller detects the high or low level output by the magnetic sensitive switch 3 to control power-on and power-off of the circuit, namely when the magnetic sensitive switch 3 detects that the magnetic field is intensified, the magnetic sensitive switch 3 outputs the high level, and the controller controls the electric circuit of the electric pressure cooker 100 to be powered off; and when the magnetic sensitive switch 3 detects that the magnetic field is weakened, the magnetic sensitive switch 3 outputs the low level, and the controller controls the electric circuit of the electric pressure cooker 100 to be powered on.

That is to say, when the magnetic member 4 is at the first position relative to the magnetic sensitive switch 3, the magnetic sensitive switch 3 detects that the magnetic field is weakened and the magnetic sensitive switch 3 outputs the low level, the electric circuit of the electric pressure cooker 100 is powered on, namely the electric pressure cooker 100 can be electrified to work. When the magnetic member 4 is at the second position relative to the magnetic sensitive switch 3, the magnetic sensitive switch 3 detects that the magnetic field is intensified and the magnetic sensitive switch 3 outputs the high level, the electric circuit of the electric pressure cooker 100 is powered off, namely the electric pressure cooker 100 can not work.

It could be understood herein that, when the magnetic member 4 is at the first position relative to the magnetic sensitive switch 3, the distance between the magnetic member 4 and the magnetic sensitive switch 3 may be relatively long; and when the magnetic member 4 is at the second position relative to the magnetic sensitive switch 3, the distance between the magnetic member 4 and the magnetic sensitive switch 3 may be relatively short. Thus, the purpose that the magnetic sensitive switch 3 can detect the magnetic field with different intensity may be achieved.

The working principles of the magnetic sensitive switch 3 and the magnetic member 4 belong to the prior art and are well known for those skilled in the art, so they will not be described in detail herein.

When the cooker cover 2 rotates relative to the cooker body 1, the magnetic member 4 can move between the first position and the second position. Specifically, when the cooker cover 2 rotates and is closed in place, the cooker cover 2 can enable the magnetic member 4 to be at the first position, so the electric circuit of the electric pressure cooker 100 is powered on; and when the cooker cover 2 is not closed in place, the cooker cover 2 can enable the magnetic member 4 to be at the second position, so the electric circuit of the electric pressure cooker 100 is powered off.

According to the electric pressure cooker 100 of the embodiment of the present invention, the magnetic member 4 moves through the arrangement of the magnetic sensitive switch 3 and the magnetic member 4 and through the rotation of the cooker cover 2, so that the distance between the magnetic sensitive switch 3 and the magnetic member 4 is changed, and then power-on and power-off of the electric circuit of the electric pressure cooker 100 can be controlled, that is to say, the magnetic sensitive switch 3 and the magnetic member 4 can constitute a detection device of the electric pressure cooker 100 for detecting whether the cover is closed in place; and compared with a cover-closing in-place detection device in the prior art, the combination of the magnetic sensitive switch 3 and the magnetic member 4 is simple in structure and low in manufacturing cost.

In a specific embodiment of the present invention, the magnetic member 4 may be a magnet.

In some embodiments of the present invention, the cooker body 1 may include a housing 11, an inner cooker 12 and a housing cover 13. As shown in FIG. 1 to FIG. 6, the inner cooker 12 is arranged in the housing 11, an inner container (not shown) may be placed in the inner cooker 12, and food materials may be placed in the inner container for cooking. An accommodating cavity 121 is defined between the housing 11 and the inner cooker 12, and the magnetic sensitive switch 3 is arranged in the accommodating cavity 121. It could be understood that, parts constituting the electric system of the electric pressure cooker 100 may also be arranged in the accommodating cavity 121. The housing cover 13 is sleeved outside the inner cooker 12 and closes the accommodating cavity 121, and the cooker cover 2 may be arranged on the housing cover 13 and rotate on the housing cover 13.

Specifically, as shown in FIG. 1 to FIG. 6, the electric pressure cooker 100 further includes a mounting member 5, the magnetic member 4 is arranged on the mounting member 5, the mounting member 5 can move up and down relative to the housing cover 13 of the cooker body 1, and therefore the magnetic member 4 can move between the first position and the second position through up-and-down movement of the mounting member 5. That is to say, as shown in FIG. 1 to FIG. 6, when the mounting member 5 moves downwards, the magnetic member 4 also moves downwards, and then the magnetic member 4 moves downwards from the first position to the second position. It should be noted that, the magnetic sensitive switch 3 is positioned below the magnetic member 4, and the distance between the magnetic sensitive switch 3 and the magnetic member 4 is shortened when the magnetic member 4 moves downwards from the first position to the second position, so that the magnetic sensitive switch 3 detects that the magnetic field is intensified and outputs the high level, and the electric circuit of the electric pressure cooker 100 is powered off.

Further, the upper end of the mounting member 5 penetrates through the housing cover 13 so as to match the cooker cover 2. In other words, the upper end of the mounting member 5 penetrates through the housing cover 13, the cooker cover 2 is matched with the upper end of the mounting member 5 when rotating on the housing cover 13, the mounting member 5 can move in the vertical direction, and then the magnetic member 4 can move between the first position and the second position. It should be noted that, in the description of the embodiments of the present invention, the "vertical direction" is shown by arrows in FIG. 1 to FIG. 9, for example.

Figure 8:
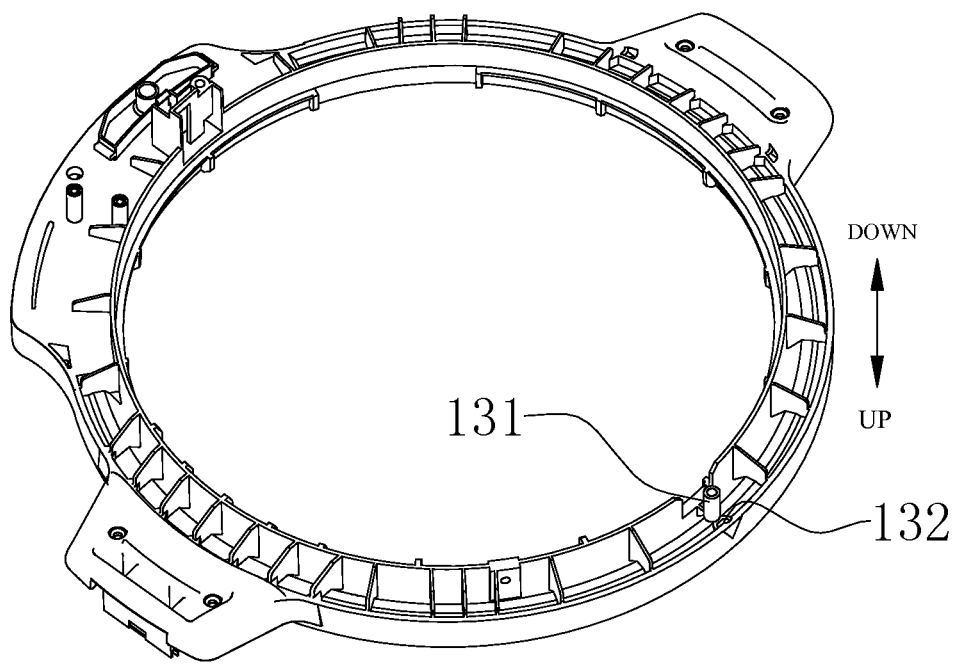
FIG. 8 is a three-dimensional diagram of a housing cover of the electric pressure cooker according to an embodiment of the present invention, and shows the structure of the lower part of the housing cover.

More specifically, as shown in FIG. 8, a guide post 131 which extends downwards is arranged on the lower surface of the housing cover 13, wherein the mounting member 5 may include a body 51 and a push rod 52.

As shown in FIG. 2, FIG. 4, FIG. 6 and FIG. 9, the body 51 is provided with a positioning hole 511 matched with the guide post 131. In other words, the guide post 131 penetrates through the positioning hole 511 to position the mounting member 5 below the housing cover 13, the magnetic member 4 may be arranged in the body 51, the push rod 52 is arranged on the body 51, and the upper end of the push rod 52 penetrates through the housing cover 13 and extends upwards, so that the cooker cover 2 can be matched with the push rod 52 when rotating on the housing cover 13; and when the cooker cover 2 is matched with the push rod 52 and the push rod 52 moves downwards, the push rod 52 may drive the body 51 to move downwards, then the magnetic member 4 moves downwards from the first position to the second position, and the electric circuit of the electric pressure cooker 100 is powered off, so that the electric pressure cooker can not work.

Specifically, the housing cover 13 may be provided with a through hole 132 penetrating through the same, and the upper end of the push rod 52 penetrates through the housing cover 13 via the through hole 132 and extends upwards.

Figure 9:
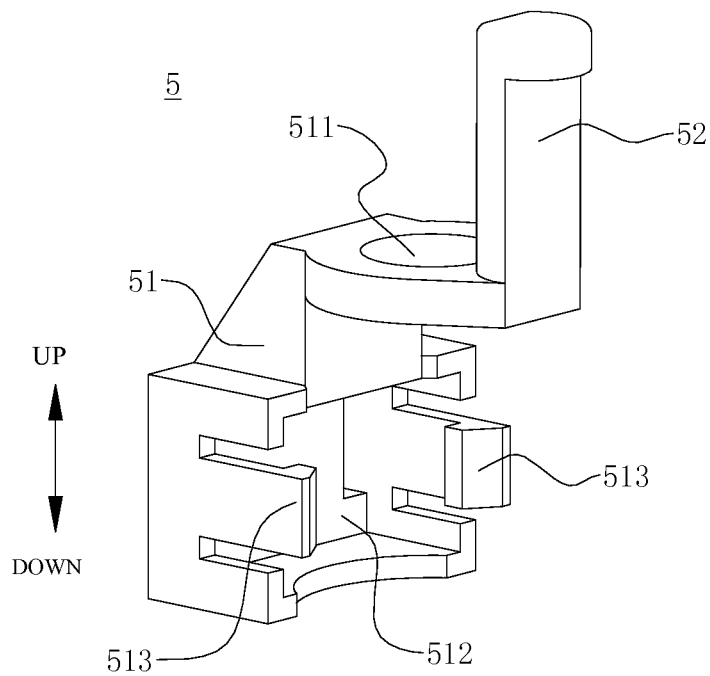
FIG. 9 is a three-dimensional diagram of a mounting member of the electric pressure cooker according to an embodiment of the present invention.

Specifically, as shown in FIG. 9, an accommodating groove 512 for placing the magnetic member 4 is formed in the body 51, and positioning buckles 513 for positioning the magnetic member 4 are arranged on the accommodating groove 512. Thus, the magnetic member 4 can be firmly arranged in the body 51. Preferably, the body 51 is a plastic part which does not affect the magnetism of the magnetic member 4, thus ensuring the effectiveness of the magnetic member 4 acting on the magnetic sensitive switch 3. The positioning buckles 513 may also be plastic parts and are integrally formed on the body 51, and when the magnetic member 4 is arranged on the body 51, the magnetic member 4 can be clamped in the accommodating groove 512 of the body 51 by using the elastic deformation capability of the plastic positioning buckles 513.

Further, the electric pressure cooker 100 further includes an elastic member 6. As shown in FIG. 2, FIG. 4 and FIG.

6, the lower end of the elastic member 6 is positioned on the guide post 131, and the upper end of the elastic member 6 presses against the body 51, namely the upper end of the elastic member 6 presses against the lower surface of the body 51. Specifically, when the cooker cover 2 rotates and the body 51 moves downwards, the elastic member 6 is in a compressed state. When the cooker cover 2 rotates and the elastic member 6 extends upwards, the elastic member 6 may use its elasticity to drive the body 51 to move upwards, and then the magnetic member 4 moves upwards from the second position to the first position.

In some optional embodiments of the present invention, the elastic member 6 may be a spring, and the spring is sleeved outside the guide post 131.

Specifically, an annular convex rib 21 is arranged at the lower part of the cooker cover 2 and provided with a yielding port 211 capable of accommodating the push rod 52. When a user covers the cooker body 1 with the cooker cover 2 and the convex rib 21 is pressed on the push rod 52, e.g. as shown in FIG. 3 and FIG. 4, the magnetic member 4 is located at the second position, the cooker cover 2 is not covered in place at the moment, and the electric circuit of the electric pressure cooker 100 is powered off, so that the electric pressure cooker can not work.

When the user rotates the cooker cover 2 to rotate the yielding port 211 to a position where the push rod 52 is located, e.g. as shown in FIG. 5 and FIG. 6, a downward force no longer exists above the push rod 52, the spring can drive the body 51 to move upwards at the moment, the push rod 52 can be accommodated in the yielding port 211, the magnetic member 4 is located at the first position, then the cooker cover 2 is covered in place, and the electric circuit of the electric pressure cooker 100 is powered on, so that the electric pressure cooker can be used for cooking.

It could be understood herein that, when the cooker cover 2 is not buckled on the cooker body 1, e.g. as shown in FIG. 1 and FIG. 2, a downward force does not exist on the push rod 52 either, that is to say, the spring can drive the body 51 to move upwards at the moment, so that the magnetic member 4 is located at the first position, the electric circuit of the electric pressure cooker 100 is powered on, and the electric pressure cooker can be used for cooking. That is to say, the electric pressure cooker 100 according to the embodiment of the present invention can also be used for cooking when the cover is opened. Compared with the electric pressure cooker which can not be used for cooking when its cover is opened in the prior art, the electric pressure cooker 100 of the present invention can provide more cooking choices for users and meet different requirements of the users, and is more convenient to use.

In some optional embodiments of the present invention, as shown in FIG. 1 to FIG. 6, the electric pressure cooker further includes a screw 7, the screw 7 is arranged on the guide post 131, and the lower end of the spring presses against the head end 71 of the screw 7. That is to say, the spring is positioned on the guide post 131 through the screw 7. Specifically, an internal thread may be formed in the guide post 131, and the screw 7 may be matched with and fastened on the internal thread.

As shown in FIG. 1 to FIG. 6, in some examples of the present invention, the magnetic sensitive switch 3 may be arranged on a control panel 8 of the electric pressure cooker 100. It could be understood that, the control panel 8 is an important part constituting the electric system of the electric pressure cooker 100, and the control panel 8 is arranged in the accommodating cavity 121.

A water retaining part is also arranged in the accommodating cavity 121, and a relatively closed accommodating space 122 is defined between the water retaining part and the wall of the accommodating cavity 121. It could be understood herein that, "relatively closed" indicates that the accommodating space 122 is a part of the accommodating cavity 121, and this part is isolated from the other part of the container, wherein the inner cooker 12 is arranged in the other part. The magnetic sensitive switch 3 is arranged in the relatively closed accommodating space 122, and specifically, the control panel 8 may be arranged in the accommodating space 122. The relatively closed accommodating space 122 may be used for isolating the control panel 8 therein to achieve a waterproof effect on the control panel 8, the magnetic sensitive switch 3 and the like, so that the use safety of the electric pressure cooker 100 can be improved.

It could be understood that, other components of the electric pressure cooker 100 may be known and are well known by those skilled in the art, so they are not redundantly described herein.

In the description of the specification, description of terms "an embodiment", "some embodiments", "schematic embodiments", "examples", "specific examples" or "some examples" and the like are referenced to indicate that specific features, structures, materials or characteristics described by the embodiments or examples are included in at least one embodiment or example of the present invention. In the specification, the schematic expression of the terms may not always indicate the same embodiments or examples. Moreover, the described specific features, structures, materials or characteristics may be combined with each other in any one or more embodiments or examples in an appropriate manner.

Although the embodiments of the present invention have been shown and described, those of ordinary skill in the art could understand that, multiple variations, modifications, substitutions and variations could be made to these embodiments without departing from the principles and purposes of the present invention, and the scope of the present invention is defined by claims and equivalents thereof.

What is claimed is:
1. An electric pressure cooker, comprising:
a cooker body, wherein the cooker body is provided with a magnetic sensitive switch and a magnetic member, and the magnetic member can move between a first position and a second position relative to the magnetic sensitive switch so that a control circuit of the electric pressure cooker can be powered on or powered off; and
a cooker cover, which is arranged on the cooker body and can rotate relative to the cooker body so that the magnetic member can move between the first position and the second position,
wherein the cooker body comprises:
a housing;
an inner cooker, wherein the inner cooker is arranged in the housing, an accommodating cavity is defined between the housing and the inner cooker, and the magnetic sensitive switch is arranged in the accommodating cavity; and
a housing cover, sleeved outside the inner cooker and closing the accommodating cavity,
wherein the electric pressure cooker further comprises a mounting member, wherein the magnetic member is arranged on the mounting member, the mounting member can move up and down relative to the housing cover, and an upper end of the mounting member penetrates through the housing cover so as to match in contact with the cooker cover, a guide post which extends downwards is arranged on the lower surface of the housing cover, the mounting member comprises:

a body, wherein the body is provided with a positioning hole matched with the guide post, and the magnetic member is arranged in the body; and a push rod, wherein the push rod is arranged on the body and the upper end of the push rod penetrates through the housing cover and extends upwards, and wherein the electric pressure cooker further comprises an elastic member of which the lower end is positioned on the guide post and the upper end presses against the body.

2. The electric pressure cooker of claim 1, further comprising a screw, wherein the screw is arranged on the guide post, and the lower end of the elastic member presses against the head end of the screw.

3. The electric pressure cooker of claim 1, wherein the elastic member is a spring, and the spring is sleeved outside the guide post.

4. The electric pressure cooker of claim 3, wherein an annular convex rib is arranged at the lower part of the cooker cover and provided with a yielding port capable of accommodating the push rod.

5. The electric pressure cooker of claim 1, wherein a water retaining plate is also arranged in the accommodating cavity, a relatively closed accommodating space is defined between the water retaining plate and the wall of the accommodating cavity, and the magnetic sensitive switch is arranged in the accommodating space.

6. The electric pressure cooker of claim 1, wherein an accommodating groove for placing the magnetic member is formed in the body, and positioning buckles for positioning the magnetic member are arranged on the accommodating groove.

7. The electric pressure cooker of claim 1, wherein the magnetic member is a magnet.

* * * * *